(12) United States Patent
Slesinski et al.

(10) Patent No.: US 11,433,704 B2
(45) Date of Patent: Sep. 6, 2022

(54) AXLE ASSEMBLY AND THE TIRE INFLATION SYSTEM MADE THEREWITH

(71) Applicant: Dana Heavy Vehicle Systems Group, LLC, Maumee, OH (US)

(72) Inventors: Steven G. Slesinski, Ann Arbor, MI (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 427 days.

(21) Appl. No.: 16/574,361

(22) Filed: Sep. 18, 2019

(65) Prior Publication Data

US 2020/0094621 A1    Mar. 26, 2020

Related U.S. Application Data

(60) Provisional application No. 62/734,291, filed on Sep. 21, 2018.

(51) Int. Cl.
| | |
|---|---|
| *B60B 35/14* | (2006.01) |
| *B60K 17/16* | (2006.01) |
| *F16H 48/38* | (2012.01) |
| *B60C 23/00* | (2006.01) |

(52) U.S. Cl.
CPC .......... *B60B 35/14* (2013.01); *B60C 23/0039* (2020.05); *B60C 23/00318* (2020.05); *B60C 23/00336* (2020.05); *B60C 23/00345* (2020.05); *B60C 23/00363* (2020.05); *B60K 17/165* (2013.01); *F16H 48/38* (2013.01); *B60B 2900/351* (2013.01); *B60B 2900/5116* (2013.01); *B60B 2900/90* (2013.01)

(58) Field of Classification Search
CPC ............. B60B 2900/5116; B60B 35/14; B60C 23/0039; B60C 23/00345; B60C 23/00363; B60C 23/00336; B60C 23/00318; F16H 7/029; F16H 7/0454; F16H 48/38; B60K 17/165
See application file for complete search history.

(56) References Cited

U.S. PATENT DOCUMENTS

| | | | | |
|---|---|---|---|---|
| 2,579,048 | A * | 12/1951 | Paul | B60C 23/00305 152/416 |
| 2,634,781 | A * | 4/1953 | Turek | B60C 23/00318 137/224 |
| 4,678,041 | A * | 7/1987 | Staudinger | A62C 27/00 169/24 |
| 6,286,565 | B1 * | 9/2001 | Pike | B60C 23/00354 141/94 |
| 6,394,159 | B1 * | 5/2002 | Cobb | B60C 23/00336 152/416 |
| 8,109,000 | B2 * | 2/2012 | Zalanca | B60B 35/16 29/897.2 |
| 9,151,377 | B2 * | 10/2015 | Weber | F16H 57/0483 |

(Continued)

*Primary Examiner* — Scott A Browne
(74) *Attorney, Agent, or Firm* — McCoy Russell LLP

(57) ABSTRACT

An axle assembly includes a first axle shaft. The first axle shaft includes a first conduit. A second axle shaft includes a second conduit. The first conduit and the second conduit are in fluid communication through a chamber. A differential is operatively connected to the first axle shaft and the second axle shaft. The chamber is at least partially disposed within the differential.

17 Claims, 6 Drawing Sheets

(56) References Cited

U.S. PATENT DOCUMENTS

| | | | |
|---|---|---|---|
| 2008/0217867 A1* | 9/2008 | Kato | F16H 57/029 |
| | | | 277/628 |
| 2015/0285296 A1* | 10/2015 | Simon | B60B 27/06 |
| | | | 464/179 |
| 2016/0152100 A1* | 6/2016 | Berkness | B60C 23/00318 |
| | | | 301/6.5 |
| 2017/0239989 A1* | 8/2017 | Downs | G01P 3/487 |

* cited by examiner

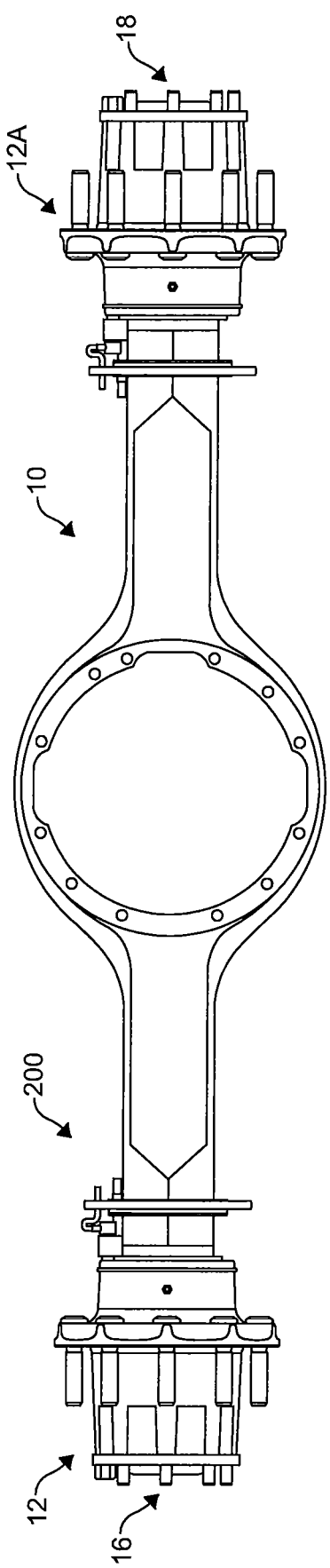
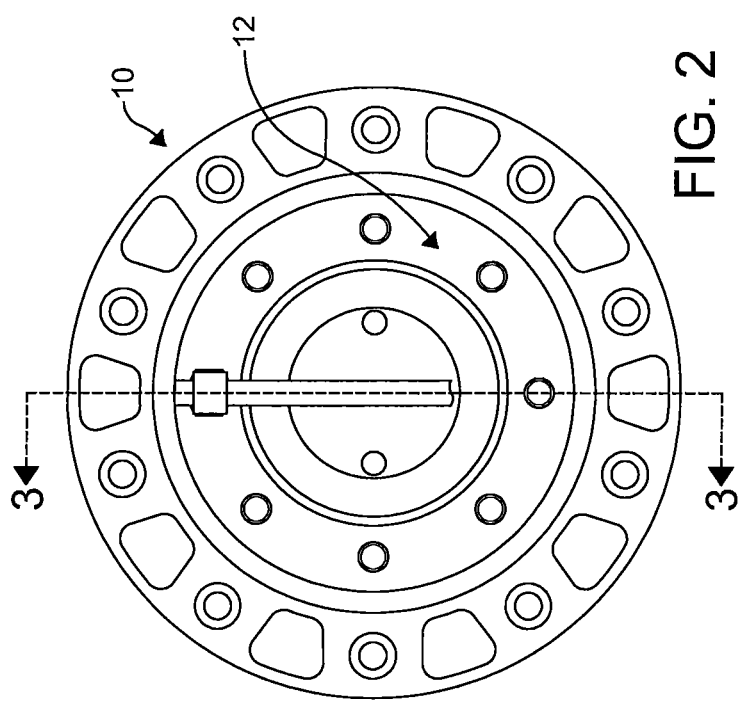
FIG. 1
FIG. 2

AXLE ASSEMBLY AND THE TIRE INFLATION SYSTEM MADE THEREWITH

CROSS-REFERENCE TO RELATED APPLICATION

This application is claiming the benefit, under 35 U.S. C. 119(e), of the provisional U.S. patent application which was granted Ser. No. 62/734,291 and filed on Sep. 21, 2018, the entire disclosure of which is hereby incorporated by reference.

BACKGROUND OF THE INVENTION

The present subject matter relates to an axle assembly. The present subject matter also relates to a tire inflation system made with the axle assembly.

Tire inflation systems may be utilized with vehicles and are often used to provide a vehicle with the versatility to maneuver over differing terrain types and to reduce maintenance requirements. For example, a wheel assembly in fluid communication with a tire inflation system may have a tire pressure that can be lowered to provide additional traction for the vehicle or raised to reduce the rolling resistance and increase the fuel efficiency of the vehicle.

However, tire inflation systems known in the art are complex and expensive to manufacture. As such, it would be desirable to provide an axle assembly that could be utilized in a tire inflation system that is reduces the complexity and expense associated with the known systems.

SUMMARY

Embodiments of an axle assembly are provided. In an embodiment, the axle assembly comprises a first axle shaft. The first axle shaft includes a first conduit. A second axle shaft includes a second conduit. The first conduit and the second conduit are in fluid communication through a chamber. A differential is operatively connected to the first axle shaft and the second axle shaft. The chamber is at least partially disposed within the differential.

BRIEF DESCRIPTION OF THE SEVERAL VIEWS OF THE DRAWING

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way.

FIG. 1 depicts an axle assembly in accordance with the invention;

FIG. 2 depicts an end view of the axle assembly of FIG. 1;

DETAILED DESCRIPTION

Figure 3:
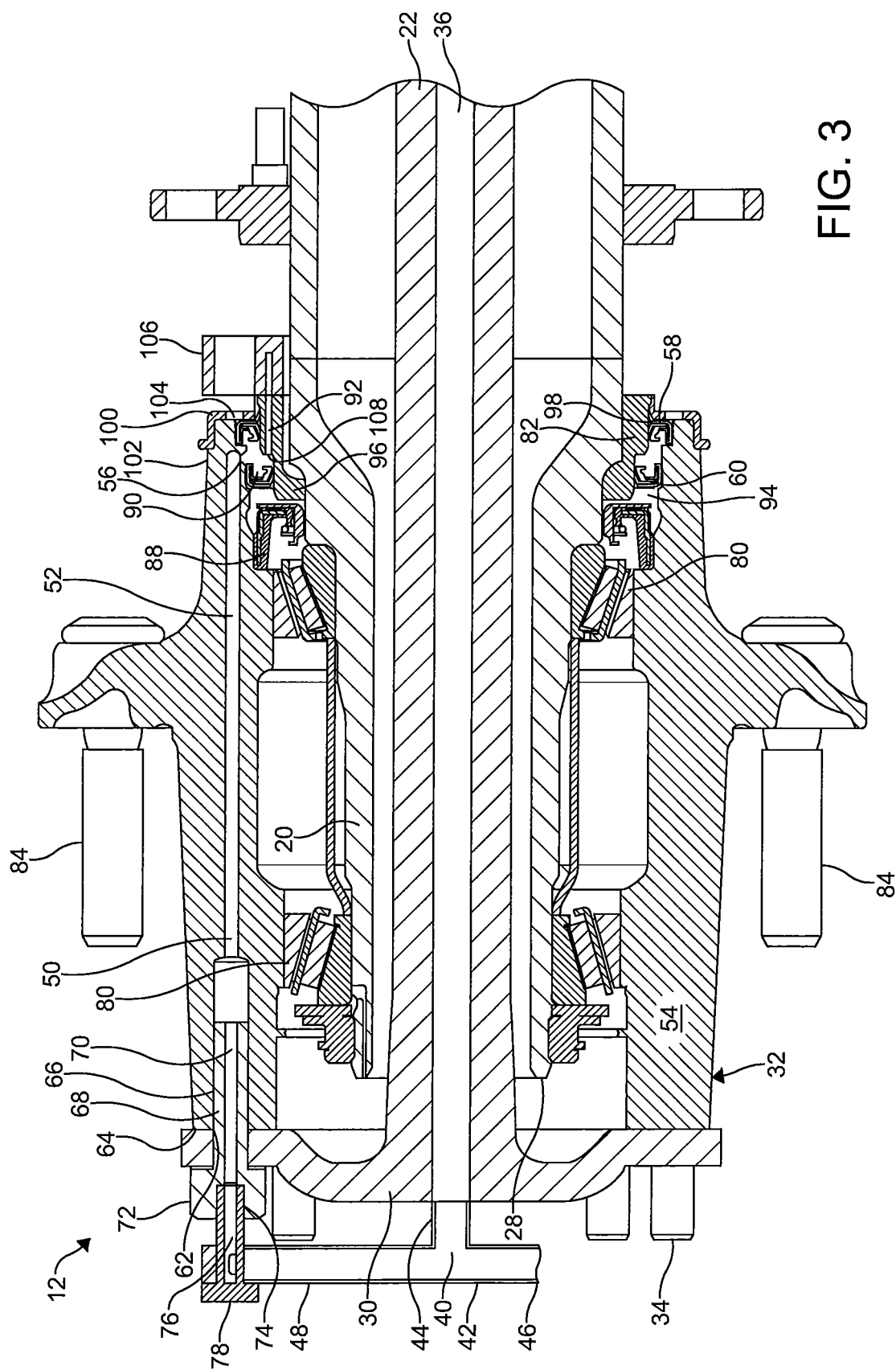
FIG. 3 depicts a cross-sectional view of a portion of the axle assembly of FIG. 2 along line 3-3 with the ABS sensor removed for clarity.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless the claims expressly state otherwise. Also, although they may not be, like elements in various embodiments described herein may be commonly referred to with like reference numerals within this section of the application.

Embodiments of an axle assembly 10 and a tire inflation system 200 are described herein. The axle assembly 10 will be described in connection with a vehicle (not depicted). It would be understood by one of ordinary skill in the art that the various embodiments of the axle assembly 10 described herein may have applications to commercial and off-highway vehicles. Furthermore, it would be understood by one of ordinary skill in the art that these embodiments could have industrial, locomotive, military, and aerospace applications, as well as applications in consumer, electric, and autonomous or semi-autonomous vehicles.

An embodiment of the axle assembly 10 is illustrated in FIG. 1. As shown, the axle assembly 10 may comprise two wheel end assemblies 12, 12A. In some embodiments, the axle assembly 10 may be of the drive axle variety. In other embodiments (not depicted), the axle assembly 10 may be of the steer axle variety.

The axle assembly 10 is utilized to transfer a pressurized fluid such as, for example, air to one or more wheel assemblies (not depicted) from a pump conduit of the tire inflation system 200. When pressurized fluid is pumped into, or a pressure is applied to the axle assembly 10 from the pump conduit, the pressurized fluid travels to and through the axle assembly 10 and from a first end 16 of the axle assembly 10 to a second end 18 of the axle assembly 10. Pressurized fluid may be directed to the axle assembly 10 to maintain one or more wheel assemblies at a desired pressure, in response to changes in ambient temperature, or in response to changes in terrain.

As illustrated in FIG. 3, the first wheel end assembly 12 comprises a portion of the axle housing 20. The axle housing 20 may be formed unitarily or may comprise a plurality of components coupled together. The axle housing 20 is a hollow member in which a first axle shaft 22 and a second axle shaft 24, which is illustrated best in FIG. 6, may be rotatably disposed. In an embodiment, the axle housing 20 comprises an outer surface, a portion 26 of which has a stepped, substantially cylindrical shape with a diameter that reduces toward an first outboard end 28 thereof.

The first axle shaft 22 is rotatably disposed in the axle housing 20 and may be driven. The first axle shaft 22 may include a flanged end 30, and the flanged end 30 may have a plurality of perforations formed therethrough for coupling the first axle shaft 22 to a first hub assembly 32. The first axle shaft 22 may be coupled with the first hub assembly 32 with a plurality of threaded fasteners 34. However, it should be understood that the first axle shaft 22 may be coupled with the first hub assembly 32 in any other conventional manner.

Figure 4:
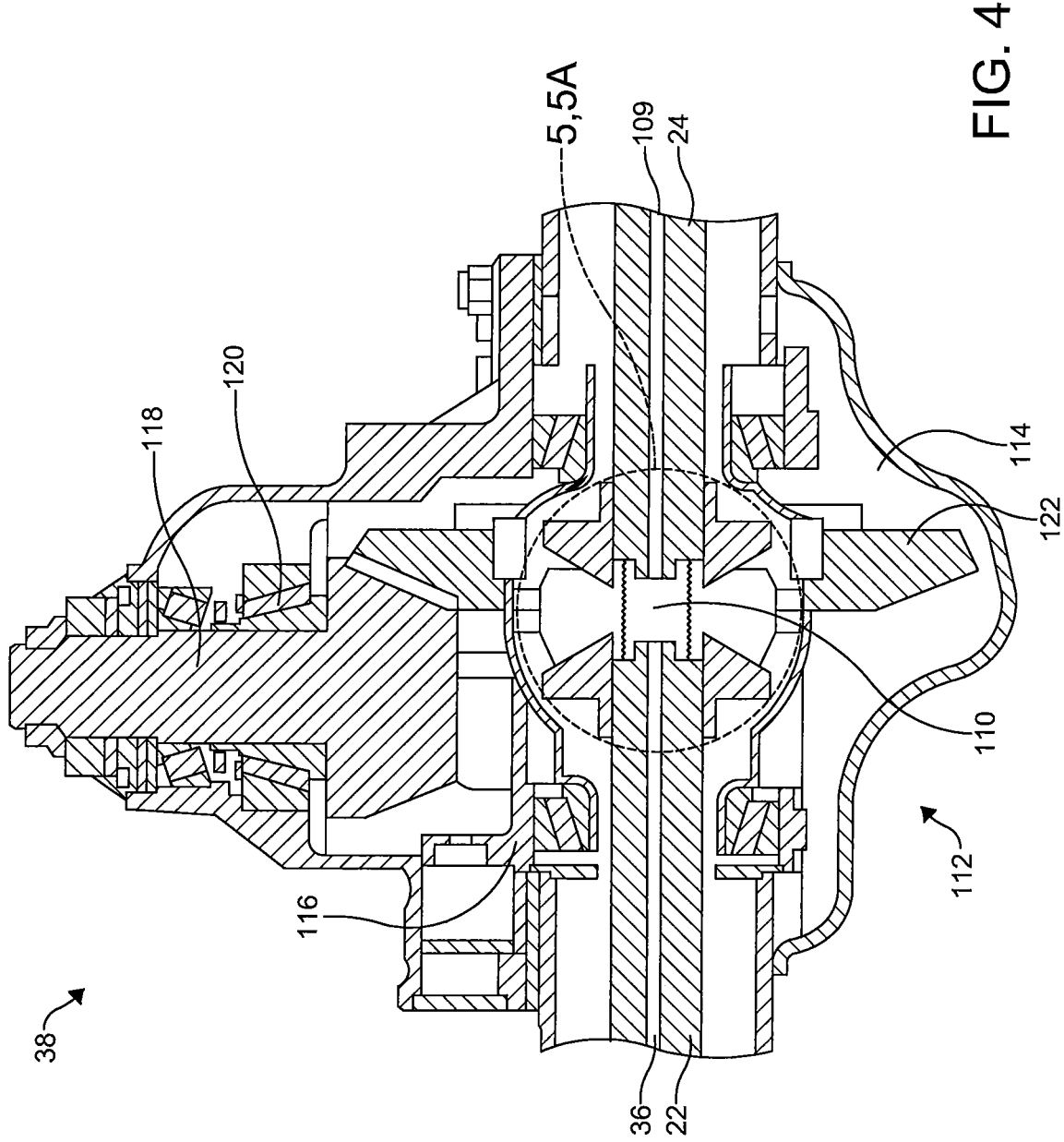
FIG. 4 depicts a sectional view of a portion of an embodiment of a differential suitable for use in the axle assembly of FIG. 1.

Preferably, the first axle shaft 22 comprises a first conduit 36 for directing a pressurized fluid such as pressurized air to the second wheel end assembly 12A. The first conduit 36 extends from the flanged end 30 of the first axle shaft 22 toward a differential 38, which is illustrated in FIG. 4. Preferably, the first conduit 36 is concentric with the first axle shaft 22.

The first conduit 36 is in fluid communication with a first coupling conduit 40. In some embodiments, the first conduit 36 receives pressurized fluid from the first coupling conduit 40. In other embodiments, the first coupling conduit 40 receives pressurized fluid from the first conduit 36. The first coupling conduit 40 may also be in fluid communication with a first wheel assembly (not depicted). The first wheel assembly may comprise one or more tires. Fluid communication between the first coupling conduit 40 and first wheel assembly allows the tire pressure of the first wheel assembly to be increased to a desired level. In certain embodiments, the fluid communication between the first coupling conduit 40 and first wheel assembly allows the tire pressure of the first wheel assembly to be decreased to a desired level. To facilitate fluid communication between the first coupling conduit 40 and first wheel assembly a wheel valve (not depicted) may be provided. Wheel valves known in the art are suitable for use with the axle assembly 10 and tire inflation system 200.

In some embodiments, the first coupling conduit 40 is defined by a first coupler 42. The first coupler 42 may be a hose member or another hollow member suitable for directing a pressurized fluid. In an embodiment, the first coupler comprises a first branch 44 secured to the flanged end 30 of the first axle shaft 22, a second branch 46 that extends to the first wheel assembly, and a third branch 48 that extends toward a hub conduit 50.

The first coupling conduit 40 is in fluid communication with the hub conduit 50. A first portion 52 of the hub conduit 50 may be formed through a portion of a first hub 54. The first portion 52 of the hub conduit 50 includes an inlet 56 formed adjacent the inboard end of the first hub 54. The inlet 56 is disposed adjacent an inner rotary seal 58 and an outer rotary seal 60. In an embodiment, the inlet 56 is formed in the inner surface of the first hub 54 between the inner rotary seal 58 and the outer rotary seal 60. An outlet 62 of the hub conduit 50 is formed adjacent to an outboard end 64 of the first hub 54. A second portion 66 of the hub conduit 50 may have an increased diameter with respect to a remaining portion(s) 52 of the hub conduit 50 and, in an embodiment, comprises threads formed therein for receiving a fastener 68 such as, for example, an axle bolt or an axle stud.

In some embodiments, a fastener conduit 70 is formed through the fastener 68. In one such embodiment, the fastener 68 is engaged with the first hub 54. The fastener conduit 70 is in fluid communication with the hub conduit 50. The fastener 68 is disposed through the flanged end 30 of the first axle shaft 22 such that it is sealingly engaged with the outlet 62 of the hub conduit 50. The second portion 66 of the hub conduit 50 facilitates fluid communication between the first portion 52 of the hub conduit 50 and the fastener conduit 70.

The fastener 68 may be an axle bolt. In an embodiment, a head portion 72 of the axle bolt abuts the flanged end 30 of the first axle 16. In some embodiments, a locking washer (not depicted) is positioned between the head portion 72 and the flanged end 30 of the first axle 16. In this embodiment, the locking washer is disposed around a portion of the fastener 68. The locking washer abuts an outboard end surface of the flanged end 30 of the first axle 16 and the fastener head portion 72. The locking washer is provided between the fastener 68 and the first axle 16 to provide a seal at an interface of the fastener 68 and the first axle 16 so that pressurized fluid directed through the hub conduit 50 is transferred to the fastener conduit 70 and vice versa. In an embodiment, the locking washer is as described in provisional U.S. patent application Ser. No. 62/174,627, the entire disclosure of which is hereby incorporated by reference. However, in other embodiments (not depicted), the locking washer may be replaced with a non-locking sealing washer. The sealing washer may be located in a similar position to, and perform a similar function to, the locking washer described above. In still other embodiments (not depicted), the axle assembly 10 does not include a washer. In these embodiments, a sealing material such as, for example, Loctite® Dri-Loc® Threadlocker (not depicted), a product of the Henkel Corporation who's United States headquarters is located at One Henkel Way, Rocky Hill, Conn. 06067, may be utilized to seal the interface between the fastener 68 and the first axle 16. In these embodiments, the sealing material is located on the threaded portion of the fastener 68. In other embodiments (not depicted), the axle assembly 10 may comprise a washer (locking or non-locking) and the sealing material. In further embodiments (not depicted), the axle assembly 10 comprises a washer, a sealing material, and a thread sealant. In an embodiment, the thread sealant may be a tape. In still further embodiments (not depicted), the axle assembly 10 comprises the locking washer and the thread sealant. In an additional embodiment (not depicted), the axle assembly 10 comprises a non-locking washer and thread sealant. In yet another embodiment (not depicted), the axle assembly 10 comprises a sealing material and thread sealant.

The head portion 72 of the axle bolt embodiment of the fastener 68 may have a hexagonal cross-sectional shape. The axle bolt has fastener conduit 70 formed therethrough and an outer surface that has a thread formed thereon. The thread formed in the outer surface of the axle bolt engages the thread formed in the second portion 66 of the hub conduit 50 adjacent the outboard end 64 of the first hub 54. A recess 74 having a thread formed thereon is formed in the head portion 72 of the axle bolt. In other embodiments, the fastener 68 may be an axle stud.

Another conduit 76 may be formed through a connector 78 and utilized to facilitate fluid communication between the first coupling conduit 40 and the hub conduit 50. In an embodiment, the connector 78 is engaged with the thread formed on the recess 74 of the fastener 68. Preferably, the connector 78 is sealingly engaged with the outlet 62 of the hub conduit 50. It is preferred that the connector 78 is sealingly engaged with the first coupler 42.

Preferably, the first hub 54 is an annular member and rotatably disposed on the axle housing 20 using one or more bearings 80 disposed between the first hub 54 and the axle housing 20. In an embodiment, the one or more bearings 80 are disposed about and engaged with the axle housing 20 before the inner rotary seal 58 and the outer rotary seal 60 are advanced during the manufacture of the axle assembly 10. Operating in this manner prevents misalignment of the seals 58, 60 on the sealing ring 82 during assembly.

The first hub 54 may be configured to hold the first wheel assembly, which is coupled with the first hub 54 using a plurality of wheel studs 84. The first hub 54 may be attached to the first axle shaft 22 as mentioned hereinabove and be drivingly engaged therewith. As will be described below, a second hub 86 is also attached to the second axle shaft 24 in a manner similar to the one described above and drivingly engaged therewith.

A bearing seal 88 is disposed between the first hub 54 and the axle housing 20. The bearing seal 88 may be formed from an elastomeric material and may include at least one reinforcing member provided therein. The bearing seal 88 militates against lubricant used with the one or more bearings 80 from contacting the outer rotary seal 60. Therefore, the bearing seal 88 militates against lubricant applying an axial force to the outer rotary seal 60, which may displace the outer rotary seal 60 or enable lubricant to enter a chamber 90 located between the inner rotary seal 58 and the outer rotary seal 60. The bearing seal 88 is disposed at a location inboard from the one or more bearings 80 and outboard of the outer rotary seal 60. In an embodiment, as illustrated in FIG. 3, the bearing seal 88 is disposed in the first hub 54 and is in sealing contact with the first hub 54 and the axle housing 20.

The inner rotary seal 58 and the outer rotary seal 60 are spaced apart from one another and may be disposed about the outer surface of the sealing ring 82. The hub conduit 50 is in fluid communication with a flow passageway 92 formed through the sealing ring 82 via the chamber 90. In an embodiment, the inner rotary seal 58 and the outer rotary seal 60 are disposed around the sealing ring 82. In some embodiments, an inner diameter of the inner rotary seal 58 is greater than an inner diameter of the outer rotary seal 60. Additionally, the inner rotary seal 58 and the outer rotary seal 60 may be disposed in separate recesses formed in the inner surface of the first hub 54.

As illustrated, a space 94 is provided between the bearing seal 88 and the outer rotary seal 60. In an embodiment, a vent (not depicted) may be provided in the first hub 54. The vent may be in fluid communication with the space 94 between the bearing seal 88 and the outer rotary seal 60. The vent is provided to allow pressurized fluid that passes the outer rotary seal 60, and lubricant that passes the bearing seal 88, to be removed from the space 94. Removing pressurized fluid and lubricant from the space 94 militates against lubricant entering the hub conduit 50 and the flow passageway 92, and militates against the pressurized fluid entering the axle housing 20.

The inner rotary seal 58 may include a dirt excluder lip. The dirt excluder lip militates against dirt and debris from entering the chamber 90. The dirt excluder lip is disposed around a portion of the sealing ring 82.

The sealing ring 82 is fitted to the axle housing 20. Embodiments of the sealing ring are described in WO 2017/070325, the entire disclosure of which is hereby incorporated by reference, are suitable for use in the axle assembly 10. The sealing ring 82 is disposed about the outer surface 26 of the axle housing 20. In an embodiment, the sealing ring 82 is non-rotatably disposed on the outer surface 26 of the axle housing 20. The sealing ring 82 may be coupled with the outer surface 26 of the axle housing 20 via methods including, but not limited to, a press-fit, a line-to-line adhesive, a shrink-fit, or a line-to-line weld.

The sealing ring 82 is a generally annular member and may be metallic. The sealing ring 82 may comprise a sealing portion 96 and an anti-lock brake system (hereinafter "ABS") sensor portion 98. The sealing portion 96 and the ABS sensor portion 98 may be attached via one or more fasteners (not depicted).

The flow passageway 92 may be formed through the sealing ring 82 for directing the flow of pressurized fluid through the sealing ring 82. The flow passageway may be in fluid communication with the pump conduit, which is in communication with a fluid pump or another source of pressurized fluid.

An ABS sensor (not depicted) may be provided and disposed inboard of a tone ring 100. The ABS sensor reads a rotational rate of the tone ring 100 and may be utilized to determine the speed of the vehicle. Tone rings known in the art are suitable for use in the axle assembly 10. In certain embodiments, the tone ring 100 comprises a plurality of apertures and is generally annular. In this embodiment, the tone ring 100 comprises an inner diameter, which defines a major aperture, and an outer diameter. The inner diameter is greater than an outer diameter of the sealing portion 96 such that the tone ring 100 can be positioned around a portion of the sealing portion 96.

The tone ring 100 is attached to the outer surface 102 of the first hub 54 at the inboard end 104 thereof. In this location, the tone ring 100 is positioned between the inboard end 104 of the first hub 54 and the ABS sensor mount 106. In an embodiment, the tone ring 100 is press-fit onto the first hub 54 and is provided inboard of the inner rotary seal 58 and the outer rotary seal 60. In an embodiment, the tone ring 100 abuts the inner rotary seal 58. In this embodiment, the tone ring 100 prevents the inner rotary seal 58 from moving axially inboard along an outer surface of the sealing portion 96.

At the inlet, the flow passageway 92 is in fluid communication with the pump conduit. In an embodiment, as illustrated in FIG. 3, an outlet 108 of the flow passageway 92 is formed in the outer surface of the sealing portion 96. The outlet 108 is in fluid communication with the chamber 90 defined between the inner rotary seal 58 and the outer rotary seal 60. In an embodiment, the chamber 90 may be annular.

The first axle shaft 22 is in fluid communication with the second axle shaft 24. More particularly, the first conduit 36 is in fluid communication with a second conduit 109 provided through the second axle shaft 24. In some embodiments, the first conduit 36 may be aligned with the second conduit 109.

In some embodiments, the second conduit 109 receives pressurized fluid from the first conduit 36. In other embodiments, the first conduit 36 may receive pressurized fluid from the second conduit 109. Referring now to FIG. 4, fluid communication between the first conduit 36 and the second conduit 109 is provided through a chamber 110, which is disposed between the first conduit 36 and the second conduit 109. The chamber 110 is at least partially disposed within the differential 38. Preferably, the chamber is disposed entirely within the differential 38.

The differential 38 may be disposed in the axle housing 20. The axle housing 20 contains a lubricant such as oil or another suitable fluid that lubricates certain components of the of the axle assembly 10 such as, for example, the differential 38. The axle housing 20 may define a center portion 112, which is provided near the center of the axle housing 20. The center portion 112 may define a cavity 114 that receives at least a portion of the differential 38.

A differential carrier portion 116 may be disposed adjacent the center portion 112. The differential carrier portion 116 may be coupled to the center portion 112 by fasteners or in another suitable manner. Components of the differential 38 may be disposed within the differential carrier portion 116.

The differential 38 is configured to transmit torque to the first wheel assembly and the second wheel assembly and permits rotation of the wheel assemblies at different velocities. An input yoke may enable coupling of the axle assembly 10 to a torque source. For example, the input yoke (not depicted) may be coupled to a drive shaft (not depicted). The input yoke may be disposed on an input shaft 118. The input shaft 118 may be rotatably supported by one or more bearings 120. The one or more bearings 120 may be disposed on the differential carrier portion 116. Torque that is provided to the input shaft 118 may be transmitted to a ring gear 122. The ring gear 122 rotates about an axis. Torque may be transmitted from the ring gear 122 to each axle shaft 22, 24. Torque is transmitted from each axle shaft 22, 24 to the corresponding wheel assembly.

The differential 38 is operatively connected to the first axle shaft 22 and the second axle shaft 24. More particularly, each axle shaft 22, 24 has an inboard end that is coupled to the differential 38 to enable rotation of the axle shaft 22, 24 via the differential 38. In certain embodiments, each axle shaft 22, 24 rotates about an axis. Preferably, the axes are aligned. An axle bearing (not depicted) may be provided to support rotation of each axle shaft 22, 24. The axle bearings may be positioned between the first end and the second end of the axle shaft 22, 24. In certain embodiments, each axle bearing is disposed in the axle housing 20.

Figure 5:
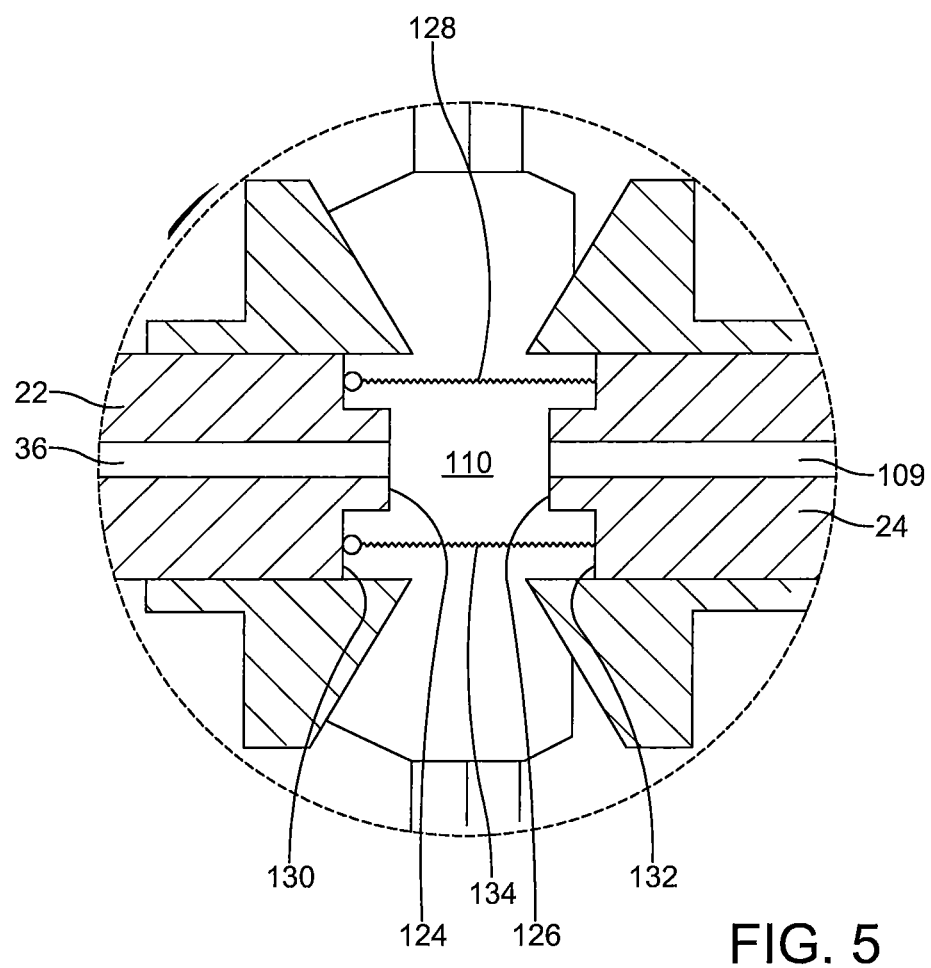
FIG. 5 depicts an enlarged view of a portion of the differential of FIG. 4.
Figure 5A:
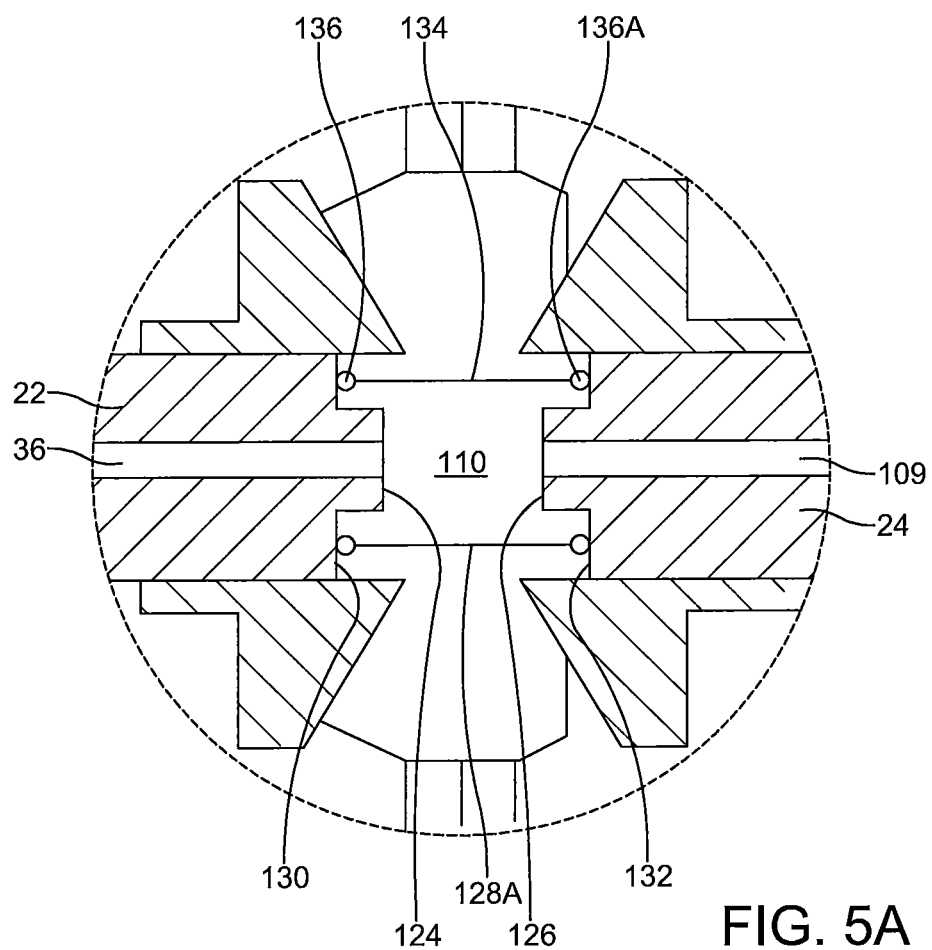
FIG. 5A depicts an enlarged view of another embodiment of a portion of a differential suitable for use in the axle assembly of FIG. 1.

As best illustrated in FIGS. 5 and 5A, in the differential 38, the first axle shaft 22 and the second axle shaft 24 are in a spaced apart relationship. Preferably, the chamber 110 is at least partially disposed between an inboard end 124 of the first axle shaft 22 and an inboard end 126 of the second axle shaft 24. The chamber 110 may be at least partially defined by a seal assembly 128, 128A. The seal assembly 128, 128A is provided within the differential 38. Within the differential 38, the seal assembly 128, 128A may be provided between the first axle shaft 22 and the second axle shaft 24. Preferably, the seal assembly 128, 128A is in sealing contact with an inboard facing surface 130 of the first axle shaft 22 and with an inboard facing surface 132 of the second axle shaft 24. In some embodiments, a portion of the seal assembly 128, 128A is disposed circumferentially about the inboard end 124 of the first axle shaft 22 and another portion of the seal assembly 128, 128A is disposed circumferentially about an inboard end 126 of the second axle shaft 24. In this embodiment, the seal assembly 128, 128A may also be disposed radially out from an inboard end of the first conduit 36 and radially out from an inboard end of the second conduit 109. In some embodiments, the seal assembly 128, 128A may be concentric with the inboard end of the first conduit 36 and the inboard end of the second conduit 109.

In an embodiment, the seal assembly 128 may be of the bellows variety. In this embodiment, the seal assembly 128 comprises a wall portion 134 that is concertinaed. The wall portion 134 allows the bellows-style seal assembly 128 to expand and contract while remaining in sealing contact with the first axle shaft 22 and the second axle shaft 24. Advantageously, bellows-style seal assembly 128 may absorb any tolerance stack-up encountered when the axle assembly 10 is manufactured or during operation of the axle assembly 10 and the tire inflation system 200. In other embodiments, like the one illustrated in FIG. 5A, the axle assembly 10 comprises a seal assembly 128A that has a wall portion 134 that is rigid. In this embodiment, the seal assembly 128A may define a chamber 110 that is of a generally cylindrical shape.

Also, as illustrated in FIG. 5A, the seal assembly 128, 128A may include one or more annular sealing members 136, 136A. Each annular sealing member 136, 136A may be attached to the wall portion 134. In some embodiments, an annular sealing member 136, 136A may be positioned at each end of the seal assembly 128, 128A. An annular sealing member 136, 136A may be utilized to enable sealing contact between the seal assembly 128, 128A and an axle shaft 22, 24.

The second conduit 109 may also be in fluid communication with a second wheel assembly (not depicted). The second wheel assembly may comprise one or more tires. Fluid communication between the second conduit 109 and second wheel assembly allows the tire pressure of the second wheel assembly to be increased to a desired level. In certain embodiments, the fluid communication between the second conduit 109 and first wheel assembly allows the tire pressure of the second wheel assembly to be decreased to a desired level.

Figure 6:
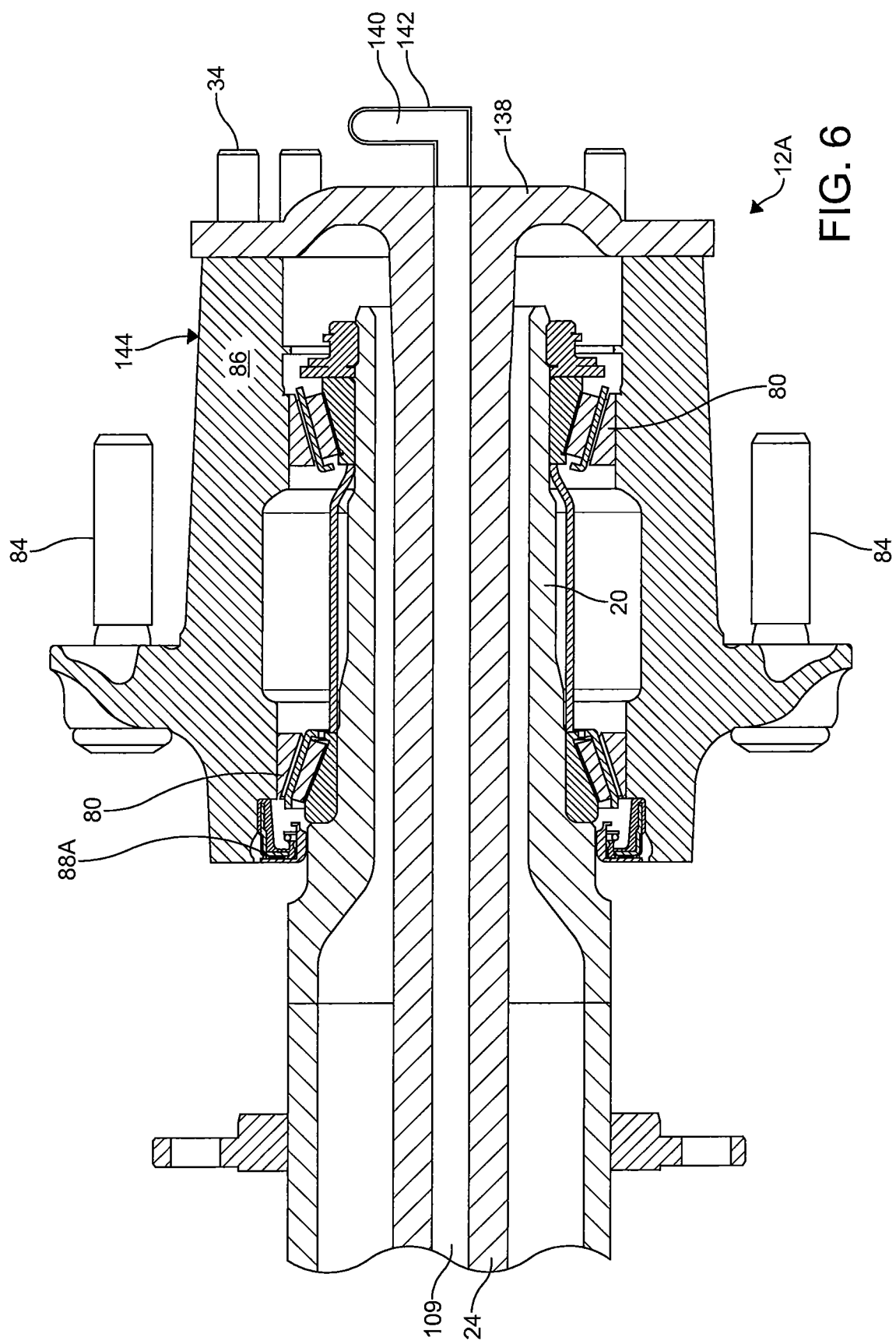
FIG. 6 depicts a cross-sectional view of an embodiment of portion of an axle assembly suitable for use in the axle assembly of FIG. 1.

Referring now to FIG. 6, the second conduit 109 extends from the differential 38 to a flanged end 138 of the second axle shaft 24. Preferably, the second conduit 109 is concentric with the second axle shaft 24. Fluid communication between the second wheel assembly and the second conduit 109 is enabled by providing a second coupling conduit 140 therebetween. To facilitate fluid communication between the second coupling conduit 140 and second wheel assembly a wheel valve (not depicted) may be provided. In some embodiments, the second coupling conduit 140 is defined by a second coupler 142. The second coupler 142 may be a hose member or another hollow member suitable for directing a pressurized fluid. The second coupler 142 may be secured to an outboard end of the second axle shaft 24 and extend to the second wheel assembly or the wheel valve.

A second hub assembly 144 is provided near the end of the second conduit 140. The second hub assembly 144 comprises the second hub 86, which is rotatably disposed on the axle housing 20 using one or more bearings 80 disposed between the second hub 86 and the axle housing 20. The second hub 86 may be an annular member and is configured to hold the second wheel assembly, which is coupled with the second hub 86 using a plurality of wheel studs 84. The second hub 86 may be attached to the second axle shaft 24 via one or more threaded fasteners 34 and drivingly engaged therewith.

A bearing seal 88A is disposed between the second hub 86 and the axle housing 20. The bearing seal 88A may be formed from an elastomeric material and may include at least one reinforcing member provided therein. The bearing seal 88A is disposed at a location inboard from the bearings 80. In an embodiment, as illustrated in FIG. 6, the bearing seal 88 is disposed in the second hub 86 and is in sealing contact with the second hub 86 and the axle housing 20.

While various embodiments of the presently disclosed subject matter have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

The invention claimed is:

1. An axle assembly, comprising:
a first axle shaft comprising a first conduit within the first axle shaft for transporting gas;
a second axle shaft comprising a second conduit within the second axle shaft for transporting gas;
a differential operatively connected to the first axle shaft and the second axle shaft; and
a chamber formed by a seal spanning a distance between an inboard surface of the first axle shaft and an inboard surface of the second axle shaft, the chamber formed within the differential, and the chamber connecting an inboard end of the first conduit with an inboard end of the second conduit.

2. The axle assembly of claim 1, further comprising a first hub rotatably disposed on an axle housing and secured to the first axle shaft, the first hub comprising a hub conduit in fluid communication with the first conduit.

3. The axle assembly of claim 1, wherein the seal surrounds each of the inboard end of the first conduit and the inboard end of the second conduit.

4. The axle assembly of claim 1, wherein the first conduit and the second conduit are coaxial with the first axle shaft and the second axle shaft.

5. The axle assembly of claim 1, wherein the first conduit extends from the differential to a flanged end of the first axle shaft.

6. The axle assembly of claim 1, wherein the second conduit extends from the differential to a flanged end of the second axle shaft.

7. The axle assembly of claim 1, wherein the first conduit is concentric with the first axle shaft and the second conduit is concentric with the second axle shaft.

8. The axle assembly of claim 2, further comprising a second hub rotatably disposed on the axle housing and secured to the second axle shaft.

9. The axle assembly of claim 1, wherein the seal is in sealing contact with the inboard surface of the first axle shaft and with the inboard surface of the second axle shaft.

10. The axle assembly of claim 1, wherein the seal is disposed radially out from the inboard end of the first conduit and radially out from the inboard end of the second conduit.

11. The axle assembly of claim 1, wherein the seal comprises a wall portion that is concertinaed.

12. The axle assembly of claim 1, wherein the seal comprises a wall portion and an annular sealing member attached to the wall portion.

13. An axle assembly, comprising:
a first hub rotatably disposed on an axle housing, the first hub comprising a hub conduit;
a first axle shaft secured to the first hub, the first axle shaft comprising a first conduit within the first axle shaft, the first conduit in fluid communication with the hub conduit;
a second axle shaft comprising a second conduit within the second axle shaft;
a differential operatively connected to the first axle shaft and the second axle shaft; and
a chamber formed within the differential by a seal spanning a distance between an inboard surface of the first axle shaft and an inboard surface of the second axle shaft, the chamber connecting an inboard end of the first conduit with an inboard end of the second conduit.

14. A tire inflation system comprising the axle assembly of claim 1.

15. The axle assembly of claim 13, wherein the seal is concertinaed and the seal expands and contracts while maintaining sealing contact with the inboard surface of the first axle shaft and the inboard surface of the second axle shaft.

16. The axle assembly of claim 13, wherein annular sealing members are connected to each of the inboard surface of the first axle shaft and the inboard surface of the second axle shaft and a respective end of the seal.

17. The axle assembly of claim 13, wherein the seal extends circumferentially around an axis of the first conduit and the second conduit and the seal extends axially in a direction of the axis to span the distance between the inboard surface of the first axle shaft and the inboard surface of the second axle shaft.

* * * * *